(12) United States Patent
Rosenstein et al.

(10) Patent No.: US 6,640,380 B2
(45) Date of Patent: Nov. 4, 2003

(54) WIPER BLADE CONNECTOR

(75) Inventors: Jerry M. Rosenstein, Parkland, FL (US); Vambi R. Tolentino, Coconut Creek, FL (US)

(73) Assignee: Pylon Manufacturing Corporation, Deerfield Beach, FL (US)

( * ) Notice: Subject to any disclaimer, the term of this patent is extended or adjusted under 35 U.S.C. 154(b) by 0 days.

(21) Appl. No.: 09/972,332

(22) Filed: Oct. 5, 2001

(65) Prior Publication Data

US 2003/0066153 A1 Apr. 10, 2003

(51) Int. Cl.[7] .................................................. B60S 1/40
(52) U.S. Cl. ..................... 15/250.32; 403/321; 403/3; 403/4; 403/329
(58) Field of Search .......................... 15/250.32, 250.43, 15/250.44, 250.361; 403/321, 3, 4, 329, 326

(56) References Cited

U.S. PATENT DOCUMENTS

| | | | |
|---|---|---|---|
| 4,290,164 A | 9/1981 | van den Berg | 15/250.32 |
| 4,293,974 A | 10/1981 | Gowans et al. | 15/250.32 |
| 4,296,521 A | 10/1981 | Mower | 15/250.32 |
| 4,343,062 A | 8/1982 | van den Berg | 15/250.32 |
| 4,443,907 A | 4/1984 | Chamberlain | 15/250.32 |
| 5,084,933 A | 2/1992 | Buechele | 15/250.32 |
| 5,289,608 A | 3/1994 | Kim | 15/250.32 |
| 5,332,328 A | 7/1994 | Yang | 15/250.32 |
| 5,606,765 A | 3/1997 | Ding | 15/250.32 |
| 5,611,103 A | 3/1997 | Lee | 15/250.32 |
| 5,618,124 A | 4/1997 | Chen | 15/250.32 |
| 5,632,059 A | 5/1997 | Lee | 15/250.32 |
| 5,807,016 A | 9/1998 | Herring et al. | 15/250.32 |
| 5,885,023 A | 3/1999 | Witek et al. | 15/250.32 |
| 6,161,249 A | 12/2000 | Hussaini | 15/250.32 |

FOREIGN PATENT DOCUMENTS

| | | | |
|---|---|---|---|
| DE | 3025734 | * 2/1982 | 15/250.32 |
| GB | 2041729 | 9/1980 | |
| GB | 2119637 | 11/1983 | |
| GB | 2193432 | 2/1988 | |
| GB | 9209226 | 11/1992 | |
| GB | 2322069 | 8/1998 | |

OTHER PUBLICATIONS

Installation Instructions for prior art Talon connector (2 sheets), (no date provided).
Photographs of prior art Talon connector (3 sheets), (no date provided).
Photographs of Bosch "M" prior art connector (5 sheets), (no date provided).
Photographs of Bosch "U2" prior art connector (4 sheets), (no date provided).

* cited by examiner

Primary Examiner—Gary K. Graham
(74) Attorney, Agent, or Firm—Dickinson Wright PLLC

(57) ABSTRACT

A connector for connecting a wiper blade assembly to a wiper arm. The connector includes first and second side walls spaced from one another to define a channel therebetween as well as a central bridge and rail interconnecting the first and second side walls. The central bridge and side walls define a pin passage and a rivet passage, each extending transverse to the channel. The rail is vertically spaced from the central bridge to define a tail space between the bridge and the rail. The forwardmost end of the rail is positioned rearward of the pin and rivet passages.

25 Claims, 10 Drawing Sheets

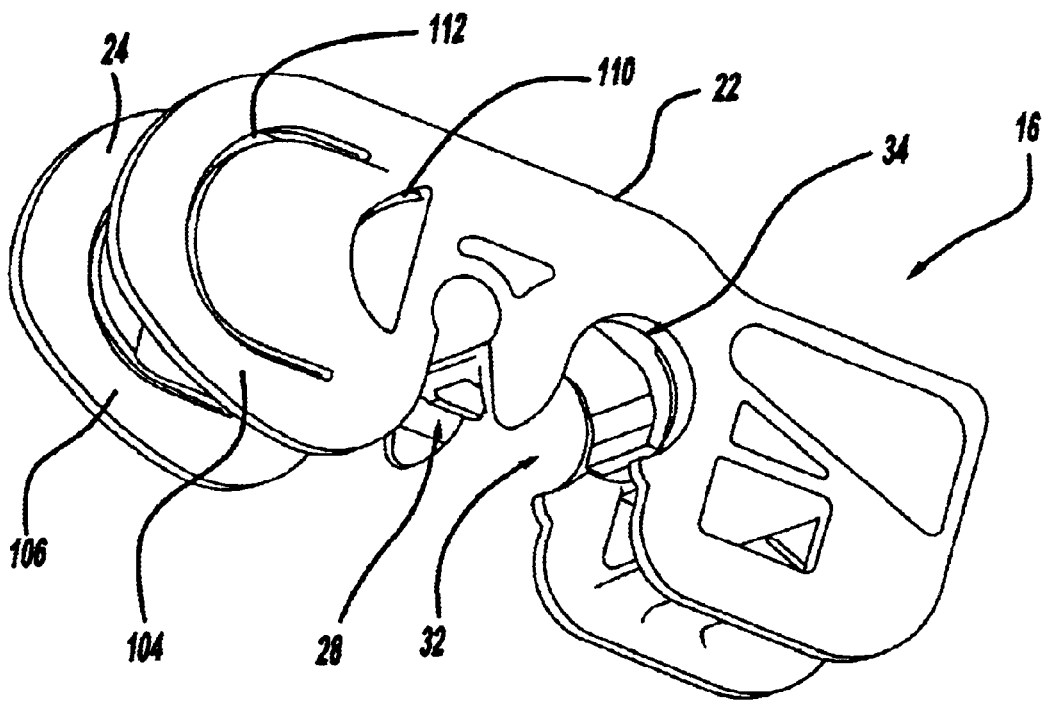
_Figure - 2_
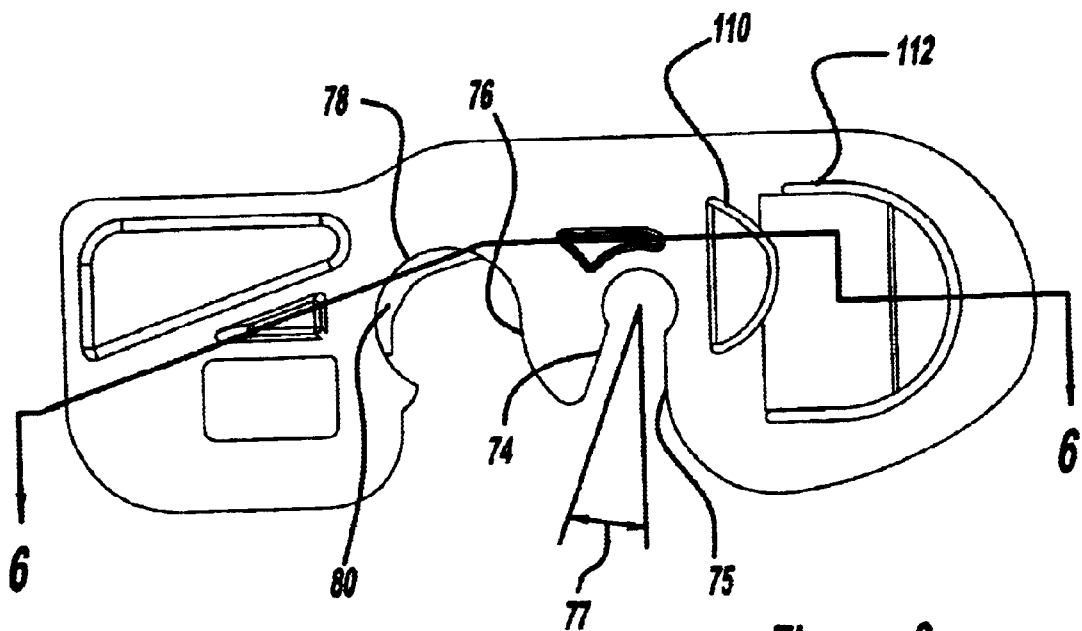
_Figure - 3_

WIPER BLADE CONNECTOR

BACKGROUND OF THE INVENTION

The present invention relates generally to the connection of a windshield wiper blade to a wiper arm and, more particularly, to a wiper blade connector configured to selectively couple multiple wiper arm types to a wiper blade.

Wiper arm configurations vary widely and include pin, hook, and bayonet shaped ends, each of various sizes. Common style sizes include 1/16 inch and 1/4 inch diameter pins as well as shepherds hook arms in nominal sizes of 7 mm width, 9 mm width and 3 mm thickness, and 9 mm width and 4 mm thickness. Due to the variety of wiper arm configurations, wiper blade manufacturers have attempted to reduce manufacturing, distribution, and inventory demands by designing universal connectors that permit connection of a windshield wiper blade to more than one of the wiper arm types.

U.S. Pat. No. 5,289,608 to Kim (entitled "Windshield Wiper Frame Connector Which Accommodates Different Size Wiper Arms"), U.S. Pat. No. 5,807,016 to Herring et al. (entitled "Connection Of Windshield Wiper Blades" and issued Sep. 15, 1998), and U.S. Pat. No. 5,611,103 issued Mar. 18, 1997 to Lee (entitled "Windshield Wiper Frame Connector Which Accommodates Different Size Wiper Arms") illustrate several prior art multi-arm connector configurations. The '608 patent to Kim discloses a connector configured for use with a 9 mm wide hook arm, a 7 mm wide hook arm, a pin-type wiper arm, and a bayonet-type wiper arm. To accommodate the multiple width hook arms, the Kim connector includes upper and lower horizontal seats of differing width as well as first and second pairs of raised portions extending inwardly from the front area of the connector side walls. The second pair of raised portions are positioned closest to a cross member and include further inwardly projecting stoppers. The stoppers and cross member define a first space therebetween and the first pair of raised portions and stoppers define a second space. The raised portions, stops, and first and second spaces receive and couple the 7 mm and 9 mm hook arms to the connector. Among the deficiencies of the connector described in the '608 patent is that it accommodates only a single hook diameter for a 9 mm width hook arm (i.e., single thickness) and does not recognize the need to, or describe a structure that functions to, effectively accommodate different diameter pin-type arms.

The '016 patent to Herring et al. discloses a connector configured to receive a single size pin-type arm and a smaller diameter hook arm having a slot in its tail section. The connector includes a movable beam that functions as a pin and hook securing mechanism. With respect to the hook connection, the beam includes a tab positioned and sized to drop into the slot formed in the tail of the hook to couple the hook to the connector. The '016 connector accommodates a larger (e.g., 9 mm×4 mm) hookslot wiper arm through the use of a separate adapter. The '016 patent also discloses several other types of adapters for coupling bayonet or straight wiper arms to the connector. While the adapters add versatility, they are cumbersome and costly. As a result, the '016 patent is illustrative of a less than satisfactory attempt to accommodate multiple wiper arm configurations with a single connector.

Yet another example of a prior art attempt to accommodate multiple wiper arm configurations with a single connector is shown in the '103 patent to Lee. The Lee patent discloses a variety of connector embodiments configured to receive different types of wiper arms. For example, the connector illustrated in Lee's FIGS. 7a and 7b includes upper and lower spaces for receiving 9 mm width hook arms having 2.5 mm and 4 mm thicknesses, respectively. The connector 10 is also configured to accommodate 7 mm and 8 mm width hook arms through stopper pairs and raised rail portions. Additionally, the embodiment shown in Lee's FIG. 11 includes two different sized slots to accommodate 3/16 inch and 1/4 inch diameter pin arms. Finally, several embodiments of this connector include angled slots to accommodate bayonet-type wiper arms. While the connector of the '103 patent is configured to accommodate several different types of wiper arms, it is deficient in several respects. For example, the configuration is overly complex, it does not readily accommodate different size pin-type wiper arms along with a consistent connection to the wiper blade rivet, careful alignment of the hook arms relative to the connector is needed prior to coupling, and the connector is extremely difficult if not impossible to efficiently mold in commercial quantities.

The above description illustrates that the prior art has failed to develop a multi-arm connector that satisfactorily addresses, among other factors, manufacturing simplicity and cost, ease of use, and robustness of design. As a result of these and other deficiencies in the art, a need exists for a multi-arm connector that permits effective coupling of a windshield wiper blade to a variety of wiper arm configurations. The wiper blade connector should also be efficiently manufacturable and configured to accommodate different size hook and pin-type wiper arms, particularly the commonly used 9 mm×3 mm hook arm and 9 mm×4 mm hook arm as well as 7 mm hook arms (all with or without slotted tails), 1/4 inch pin arm, 3/16 inch pin arm, and bayonet-type wiper arm.

SUMMARY OF THE INVENTION

The present invention is directed to a wiper blade connector that is adapted for use in coupling several different types of commonly used wiper arm configurations to a wiper blade. The connector includes first and second side walls spaced from one another to define a channel as well as a central bridge and rail interconnecting the first and second side walls. The central bridge and side walls define a pin passage and a rivet passage each extending transverse to the channel. The rail is vertically spaced from the central bridge to define a tail space and has a forwardmost end positioned rearward of the pin passage and rivet passage.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

FIG. 2 is a perspective view of a connector according to a first embodiment of the present invention;

FIG. 3 is a side elevational view of the connector shown in FIG. 2;

DETAILED DESCRIPTION OF THE PREFERRED EMBODIMENT

Figure 1:
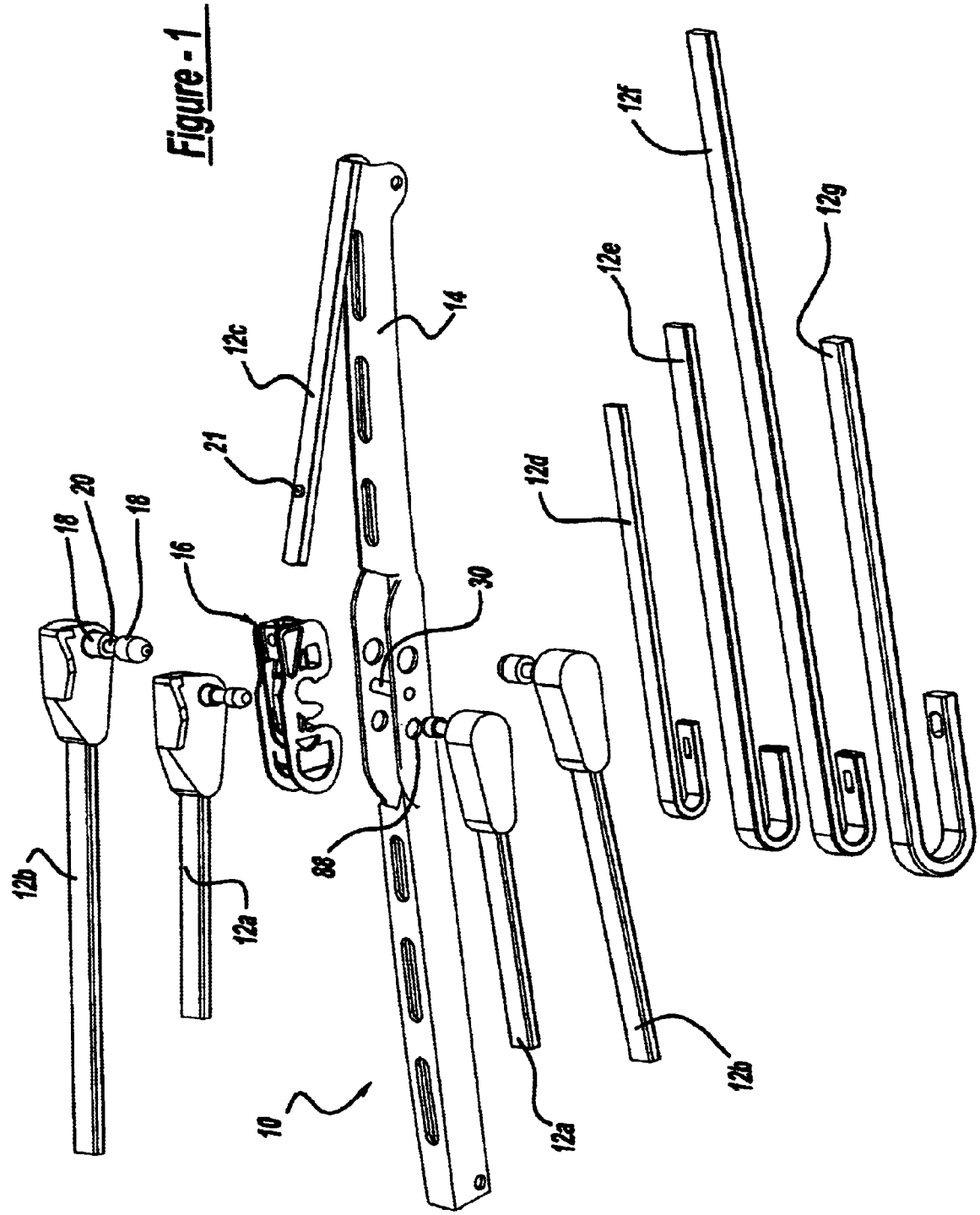
FIG. 1 is a perspective view of a wiper blade assembly illustrating several commonly used wiper arm configurations.

A windshield wiper assembly 10 according to the present invention is generally illustrated in FIG. 1 to include a wiper arm 12, a wiper blade 14, and a connector 16 for connecting the wiper arm to the wiper blade. The connector is configured to accommodate a variety of wiper arm configurations. More particularly, as illustrated in FIG. 1, the connector 16 accommodates each of the following commonly used wiper arms: a one-quarter inch pin 12a, a three-sixteenth inch pin 12b, a 7 mm bayonet 12c, a 7 mm slotted hook 12d, a 9 mm×3 mm slotless hook 12e, a 9 mm×3 mm slotted hook 12f, and a 9 mm×4 mm slotted hook 12g. The general dimensions of each of the illustrated arm configurations are generally known in the art. Each of the side pins include large diameter portions 18 and smaller diameter portions 20. The 7 mm bayonet 12c includes a cylindrical protrusion 21 extending upwardly from the generally rectangular portion of the arm. The connector 16 is configured to permit coupling of any of the aforementioned wiper arms to the wiper blade. In order to more clearly illustrate the general applicability of the connector 16, the three hook arm sizes illustrated in FIG. 1 are referred to herein as the small hook arm (7 mm hook arm 12d), a medium hook arm (9 mm×3 mm hook arms 12e and 12f), and a large hook arm (9 mm×4 mm hook arm 12g). Those skilled in the art will appreciate that the connector may be specifically configured to accommodate additional hook configurations and sizes, including unslotted 7 mm and 9 mm×4 mm hook arms.

Figure 4:
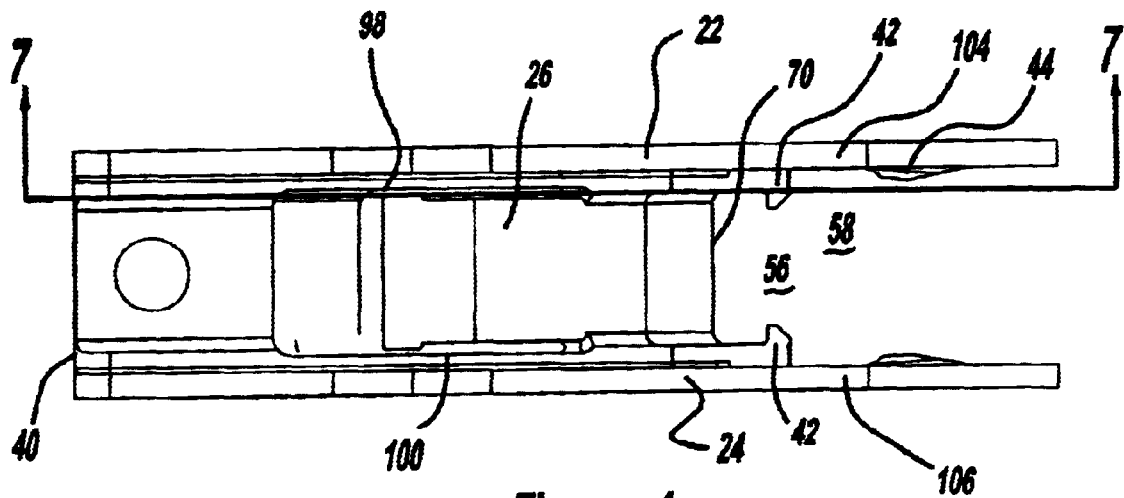
FIG. 4 is a top plan view of the connector shown in FIG. 2.
Figure 7:
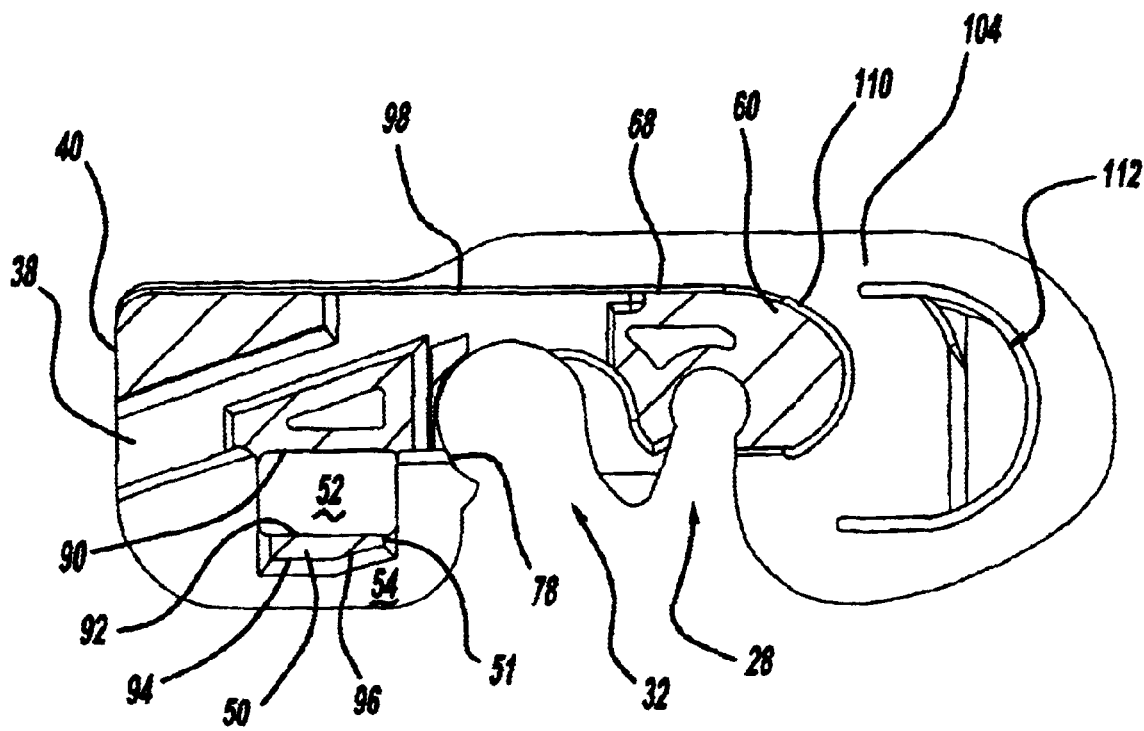
FIG. 7 is a sectional view taken along the line 7—7 shown in FIG. 4.

As is described in greater detail below, and illustrated in the attached drawings, the connector 16 of the present invention generally includes first and second side walls 22 and 24 spaced from one another and interconnected by a central bridge 26 (FIG. 4). A rivet passage 28 (FIG. 2) extends through the side walls and central bridge to receive a wiper blade pivot pin, such as rivet 30 (FIG. 1), for coupling the connector 16 to the blade 14. A pin passage 32 extends through the side walls to receive the one-quarter and three-sixteenths inch wiper arm pins 12a and 12b. The central bridge 26 separates the side walls and includes a generally arcuate clip 34 (FIG. 2) positioned rearward of the rivet passage. The arcuate clip 34 communicates with the pin passage 32 and is configured to lockingly engage the one-quarter inch or three-sixteenth inch diameter wiper arm pin (12a and 12b, respectively) within the smaller diameter portions 20 of the pins. An angled bayonet passage 38 (FIG. 7) extends forward of the rear end 40 of the connector 16 to receive the bayonet shaped wiper arm 12c.

Figure 5:
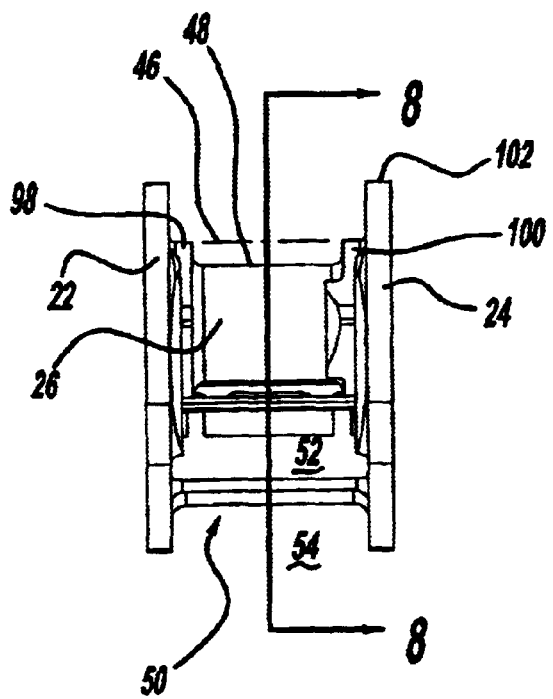
FIG. 5 is a rear elevational view of the connector shown in FIG. 2.

In addition to the two sizes of pin arms and the bayonet arm, the connector 16 is configured to accommodate the small hook arm 12d, medium hook arms 12e and 12f, and the large hook arm 12g. The connector 16 includes forward tabs 42 and 44 (FIG. 4), upper and lower horizontal seats 46 and 48 (FIG. 5), and a tail rail 50 positioned below the bridge. These connector components form small, medium, and large hook corridors to couplingly receive the corresponding hook arms. More particularly, the tail rail 50 and bridge 26 form tail spaces 52 and 54 that receive the tail of the respective hook arms. The seats 46 and 48 have 7 mm and 9 mm nominal widths to receive the body of the corresponding hook arms. Finally, the tabs 42 and 44 and bridge 26 form first and second hook spaces 56 and 58 (FIG. 4) that receive the curved hook segments and lock the hooks to the connector. In the illustrated embodiment, the smaller hook corridor is more particularly defined in part by lower horizontal seat 46, first hook space 56, and tail space 52. Similarly, the medium hook corridor is partially defined by the upper horizontal seat 48, second hook space 56, and tail space 52 and the large hook corridor is partially defined by the upper horizontal seat 48, second hook space 58, and tail space 54 (see FIGS. 9, 10, and 11). By this configuration, the connector 16 permits coupling of a variety of wiper arms to a blade without requiring the use of adapters. In addition, the connector does not require exact relative positioning of the connector and hook or pin-type wiper arms during connection and is therefore easy for consumers to use. Also, the connector components are positioned to permit efficient manufacture of the connector through the use of multi-cavity molds.

Turning now to the specific embodiments of the invention shown in the drawings, four embodiments that achieve the above benefits are described with reference to FIGS. 2–8, 9–11, 12–13, and 14, respectively. In the first connector embodiment illustrated in FIGS. 2–8, the central bridge 26 connecting first and second side walls 22 and 24 includes a front portion 60 (FIG. 8) and a rear portion 62 which, in the illustrated embodiment, are separated from one another by a gap 64. The bridge 26 defines an upwardly angled surface 66 forming the bottom of the bayonet passage 38, a flat upper bearing surface 68 forming part of the lower horizontal seat 48, and a lower surface 69. A curved front bridge segment 70 extends from the flat 68 to a rivet cavity 72 which communicates with rivet slots 74 formed in the side walls 22 and 24 to define the rivet passage 28. In the illustrated embodiment, the rivet slots 74 include rivet entrances 75 (FIG. 3) angled rearward of vertical and toward the pin passage described below. This rearward orientation 77 of the rivet entrances, preferably on the order of about ten degrees, provides a secure interlock between the connector and the wiper blade rivet that resists inadvertent disconnection during use. This configuration also orients the rivet passage relative to the other connector features in a manner that enhances the ease of manufacture and use.

The side walls 22 and 24 each include pin slots 76 (FIG. 3) that form a portion of the pin passage 32 and that are preferably, though not necessarily, positioned rearward of the rivet slots 74. The pin slots include an arcuate section 78 sized to permit the passage of the large diameter sections 18 of both the one-quarter or three-sixteenth inch diameter pin. In the embodiment shown in FIGS. 2–8, the arcuate clip 34 of the central bridge 26 includes a movable latch 80 (FIG. 8) cantilevered rearward from the forward fixed bridge 81 of front portion 60 and includes an irregularly curved engagement surface 82 that defines a pin cavity 84. The movable latch 80 terminates at the gap 64 between the front and rear portions of the central bridge thereby permitting movement of the latch relative to the first and second side walls and fixed bridge 81. The irregularly curved engagement surface 82 of the movable latch includes a first curved segment 83 configured for connecting the one-quarter inch pin arm to a wiper blade and a second curved segment 85 configured for connecting the three-sixteenth inch pin arm to the wiper blade. The first segment 83 is positioned above and forward of, and has a smaller radius than, the second segment 85. While the specific radius of each segment may vary, the radii are preferably about 0.068 and 0.086 inches for the first and second segments, respectively.

Figure 8:
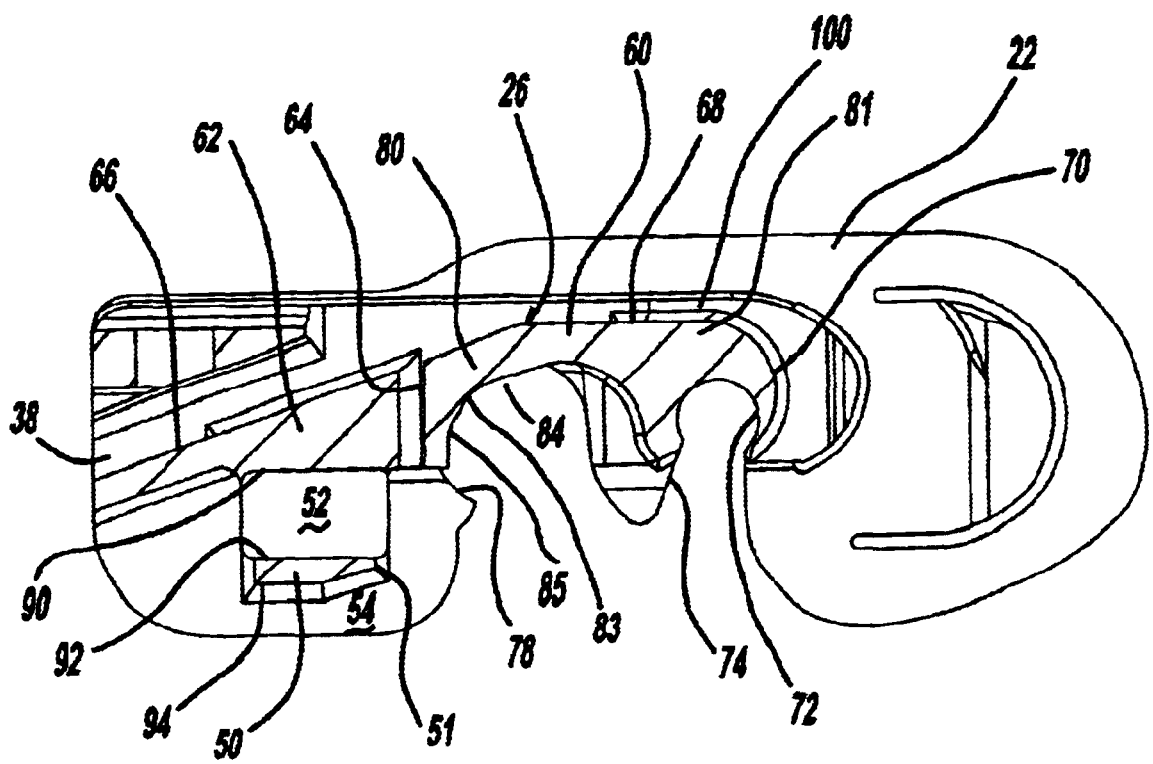
FIG. 8 is a sectional view taken along the line 8—8 shown in FIG. 5.
Figure 15:
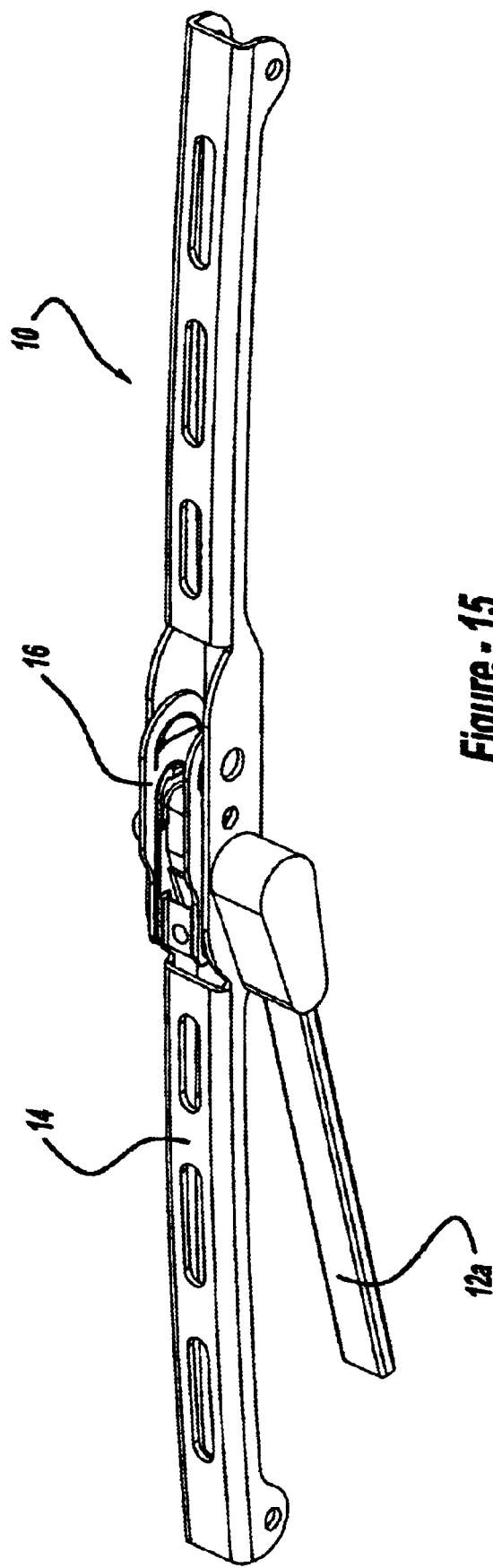
FIG. 15 illustrates the connection of a pin-type wiper arm to the connector of the present invention.

The latch 80 is illustrated in FIGS. 3 and 8 in its rest position wherein the latch partially obscures the arcuate section 78 of the pin slots 76. The latch is displaceable about its fixed end away from the rest position during coupling of the pin to the connector. The coupling may be achieved by aligning the pin slot 76 with the appropriate pin opening 88 in the wiper blade 14 and laterally displacing the pin through the opening and passage (FIG. 15). The large diameter section of the pins displace the movable latch 80 from its rest position to permit passage of the larger pin section. When the first larger section passes the latch, the deformation bias causes the latch to snap back into the smaller pin diameter section thereby coupling the pin to the connector and the wiper blade. Alternatively, the coupling may occur by rotating the connector out of communication with the openings 88, displacing the pin into the wiper blade opening 88, and rotating the connector to position the pin passage 32 about the pin. The movable latch 80 facilitates coupling of the connector to pin arms through the use of the snap-fit coupling when the latch is aligned with the smaller diameter section. This automatic coupling reduces the need for the consumer to initially align the latch with the reduced diameter section thereby facilitating the ease of use of the invention.

Focusing now to the coupling of hook arms to the connector, the rear portion 62 of the central bridge 26 includes, in addition to a portion of the upwardly angled surface 66, a lower surface 90 (FIGS. 7 and 8) defining the upper boundary of the first tail space 52. As noted above, the connector 16 includes a tail rail 50 having an upper face 92 defining the lower boundary of the first tail space 52 and a lower face 94 defining the upper boundary of the second tail space 54. A chamfer 96 is included on the lead edge of the lower face 94 to facilitate positioning of the larger hook during use. The forwardmost point 51 of the tail rail 50 (FIGS. 7 and 8) is positioned rearward of both the rivet passage 28 and the pin passage 32 so as to facilitate molding of the invention while providing a multi-functional connector as described herein.

The connector 16 also includes steps 98 and 100 (FIG. 5) having upper surfaces 101 recessed from the upper surface 102 of the side walls, positioned above the horizontal seat 48, and extending inward from the side walls to define the upper horizontal seat 46. The central span of the bridge defines the lower horizontal seat 48 that generally extends between the steps 98 and 100. This configuration defines horizontal supports of two different widths to accommodate different width hook arms. Specifically, in the illustrated embodiment, the lower horizontal seat 48 has a width between the steps 98 and 100 sufficient to accommodate a 7 mm hook arm and the side walls 22 and 24 are spaced to permit a 9 mm hook arm to rest on the upper horizontal seat 46.

The side walls 22 and 24 also include wings 104 and 106 (FIG. 4) extending forward of the central bridge 26. First and second locking tabs 42, 44 extend inward of the wings and are spaced forward of the front curved segment 70 of the central bridge 26. The connector may include one or more first tabs 42 extending a greater distance inward of the side walls than the second tabs 44 whereby the spaced locking tabs and bridge define the first and second hook spaces 56 and 58.

Figure 9:
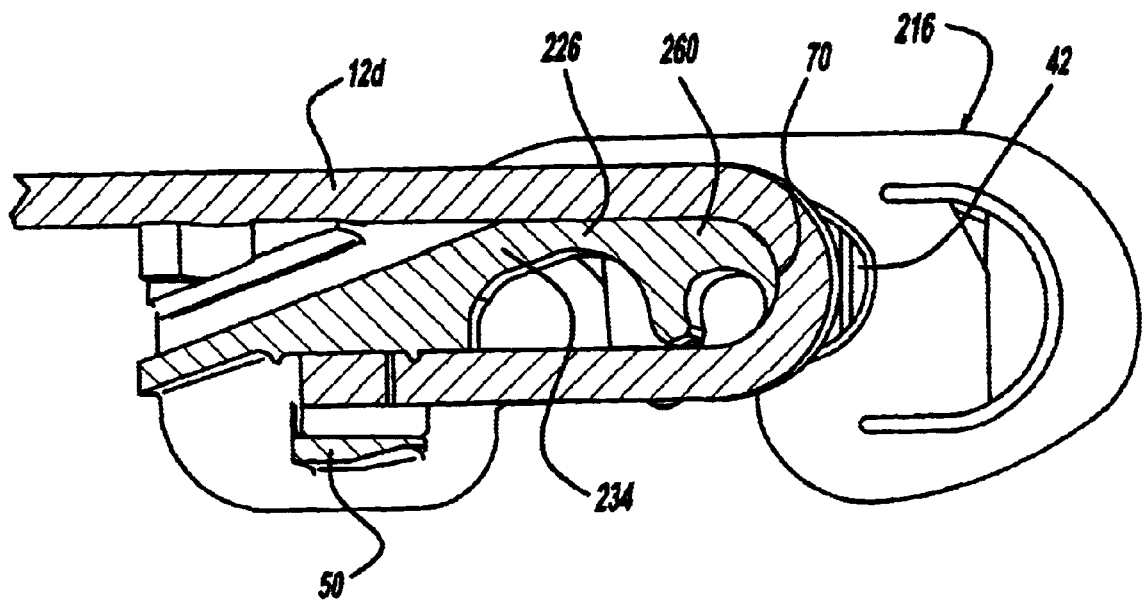
FIG. 9 is a side sectional view of a second connector embodiment illustrating a 7 mm hook arm coupled to the connector.
Figure 10:
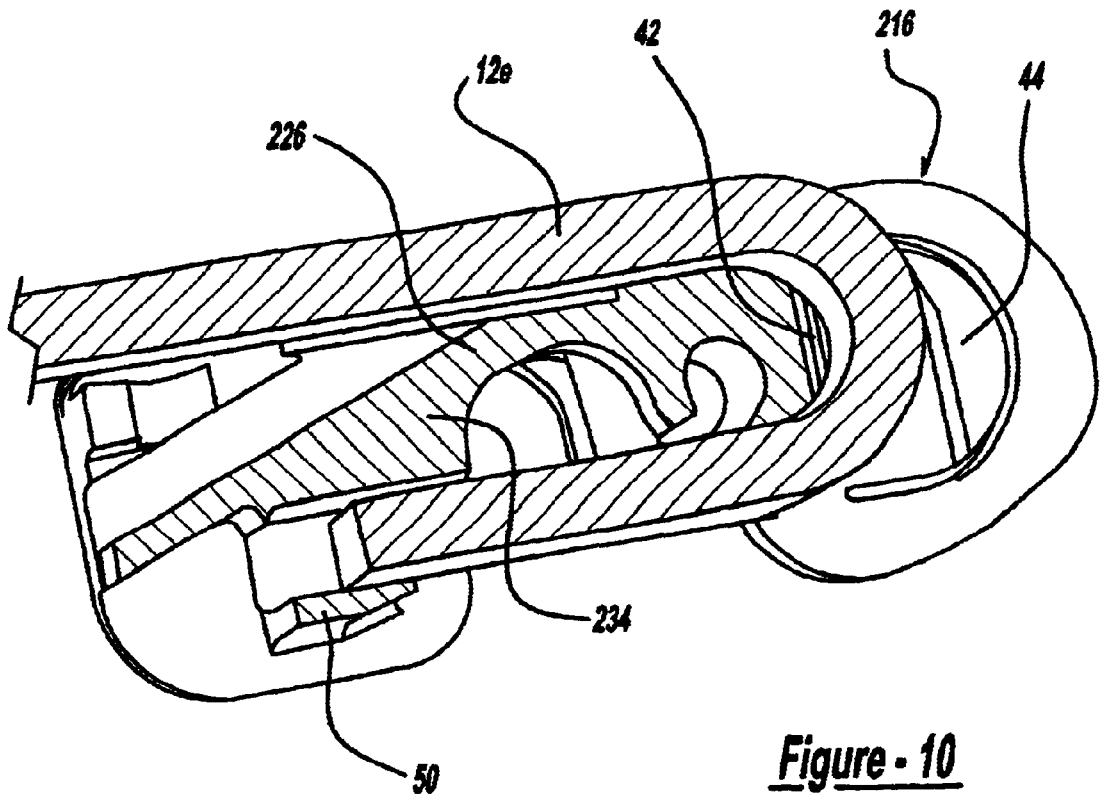
FIG. 10 is a side sectional view of the connector embodiment illustrated in FIG. 9 showing a 9 mm×3 mm hook arm coupled to the connector.

As is illustrated in FIG. 9, when a 7 mm hook arm 12d is coupled to the connector 16, the arm is positioned within the first hook space 56 between the front segment 70 and the first tab 42 as well as within the first tail space 52 above the tail rail 50. As illustrated in FIG. 10, a 9 mm×3 mm hook arm 12e is positionable within the second hook space 58 between first and second tabs 42 and 44 as well as within the first tail space 52 above the tail rail 50 whereas the 9 mm×4 mm hook arm 12g (FIG. 11) is positioned within the second space 58 and the second tail space 54 below the tail rail 50. By this configuration, multiple hook arms may be securely coupled to the connector through the use of the upper and lower horizontal seats 46 and 48, the first and second hook spaces 56 and 58, as well as the first and second tail spaces 52 and 54. Moreover, the positioning and orientation of these connector elements relative to one another permit the hook arms to be easily coupled to the connector without requiring exact orientation during coupling. For example, the positioning of the tail rail rearward of the pin and rivet passages allows variation in the positioning of the hook tail relative to the connector until the hook arm approaches its coupled position. Moreover, the position of the tail rail relative to the pin and rivet passages, i.e., the forwardmost end 51 of the tail rail 50 being rearward of the rivet and pin passages, facilitates manufacturing ease. Specifically, if the tail rail 50 were to extend forward of the pin passage, the rail would interfere with the molding of the pin and rail passages.

Figure 6:
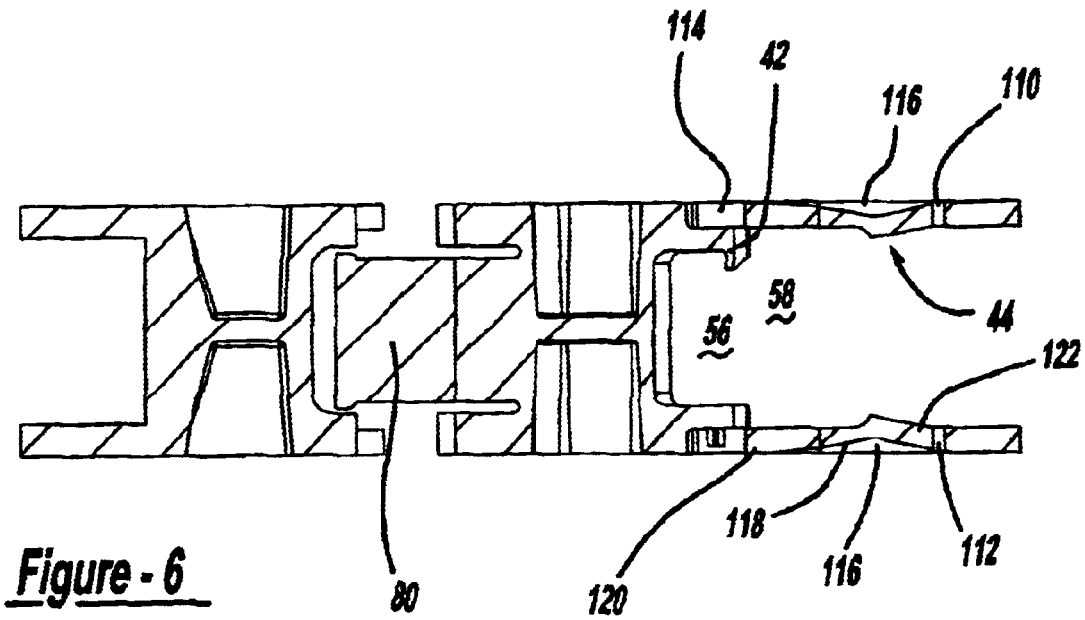
FIG. 6 is a sectional view taken along the line 6—6 shown in FIG. 3.

In addition to the versatility of coupling multiple wiper arms to a connector as described above, the first and second locking tabs 42 and 44 facilitate ease of use and connector durability. More particularly, the second locking tabs 44 are partially formed by curved, ear-shaped cutouts 110 and 112 (FIGS. 6 and 7) extending through the wings 104 of side walls 22 and 24. As is best illustrated in FIG. 6, the cutouts facilitate the molding of tabs that are cantilevered from and movable relative to the side walls. The wings include inward depressions or cavities 114 and 116 along their outer surfaces adjacent the first and second tabs. The cavities accommodate outward displacement and deflection of the tabs 42 and 44 during coupling of a hook arm without requiring the tabs to extend beyond the outward lateral extent of the side walls. More particularly, when a 7 mm hook arm is connected to the connector 16, movement of the arm into the first hook space 56 displaces the first tab 42 outwardly into cavity 114. Similarly, when a 9 mm width hook arm is coupled to the connector, the arm displaces the second tabs 44 outwardly and into cavities 116. To further facilitate this displacement, the second tabs 44 have an outer surface 118 that is generally concave from a rear end 120 fixed to the side wall toward a forward free end 122. As the width of the outer extent of the side walls is often designed to fit snugly with the wiper blade, the cavities permit displacement of the tabs without extending beyond the outer wing surface thereby facilitating coupling of the hook arms and reducing breakage of the tabs that may occur with less forgiving designs. Further, the tabs 44 are dimensioned to snugly fit the various thicknesses of both 9 mm×3 mm and 9 mm×4 mm hook arms.

Figure 11:
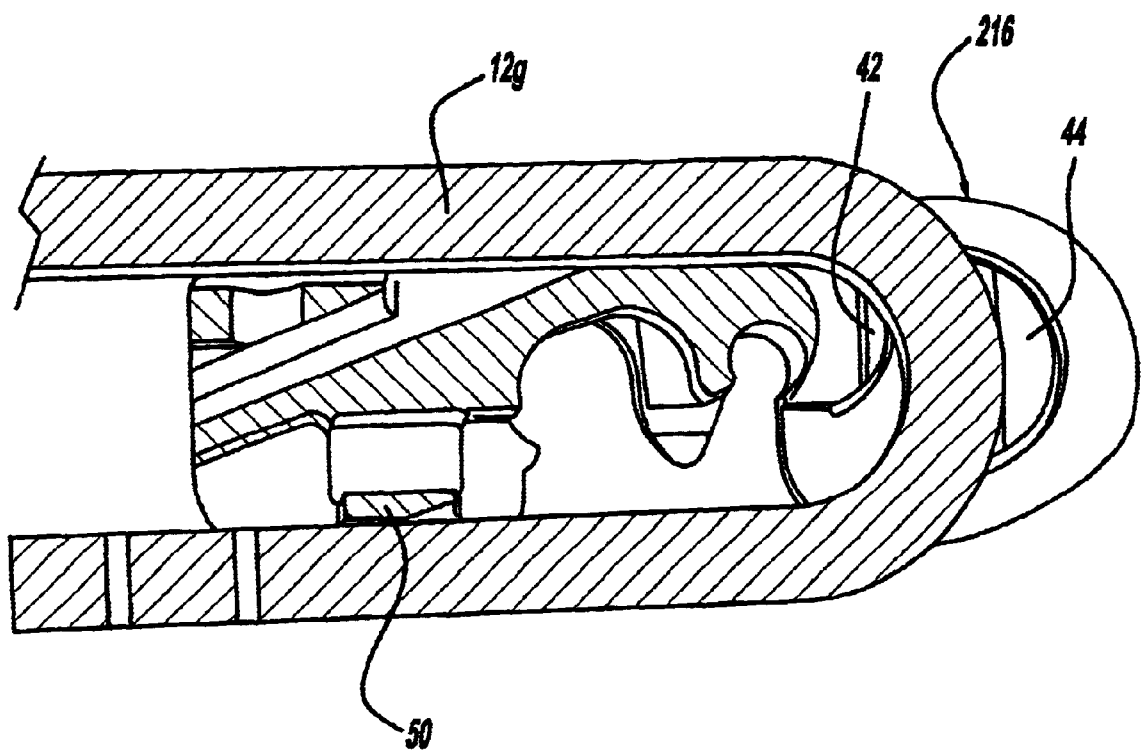
FIG. 11 is a side sectional view of the connector illustrated in FIG. 9 showing a 9 mm×4 mm hook arm coupled to the connector.
Figure 12:
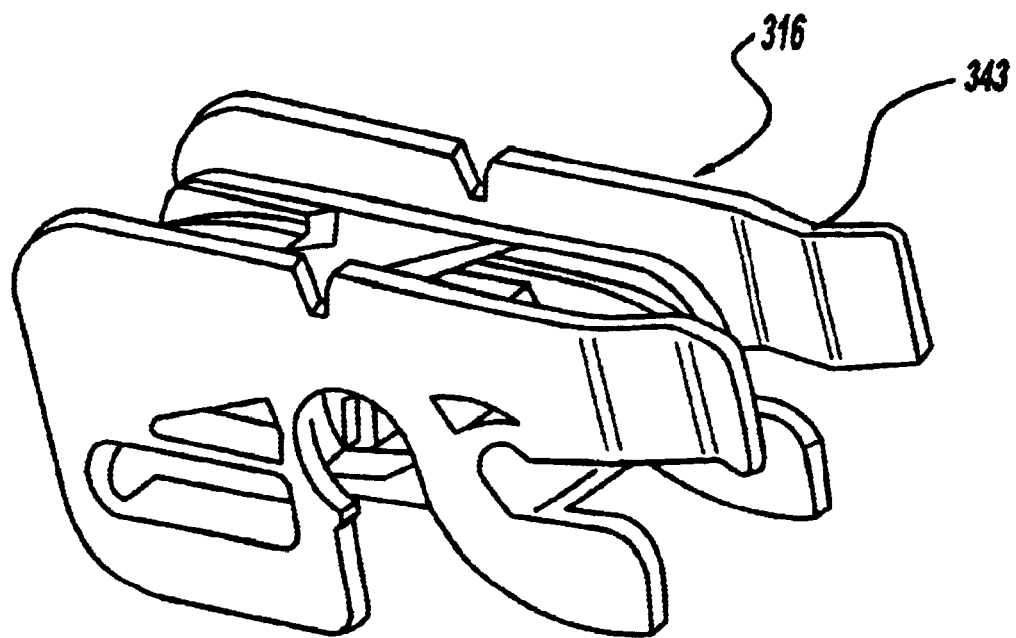
FIG. 12 is a perspective view of a third connector embodiment according to the present invention.
Figure 13:
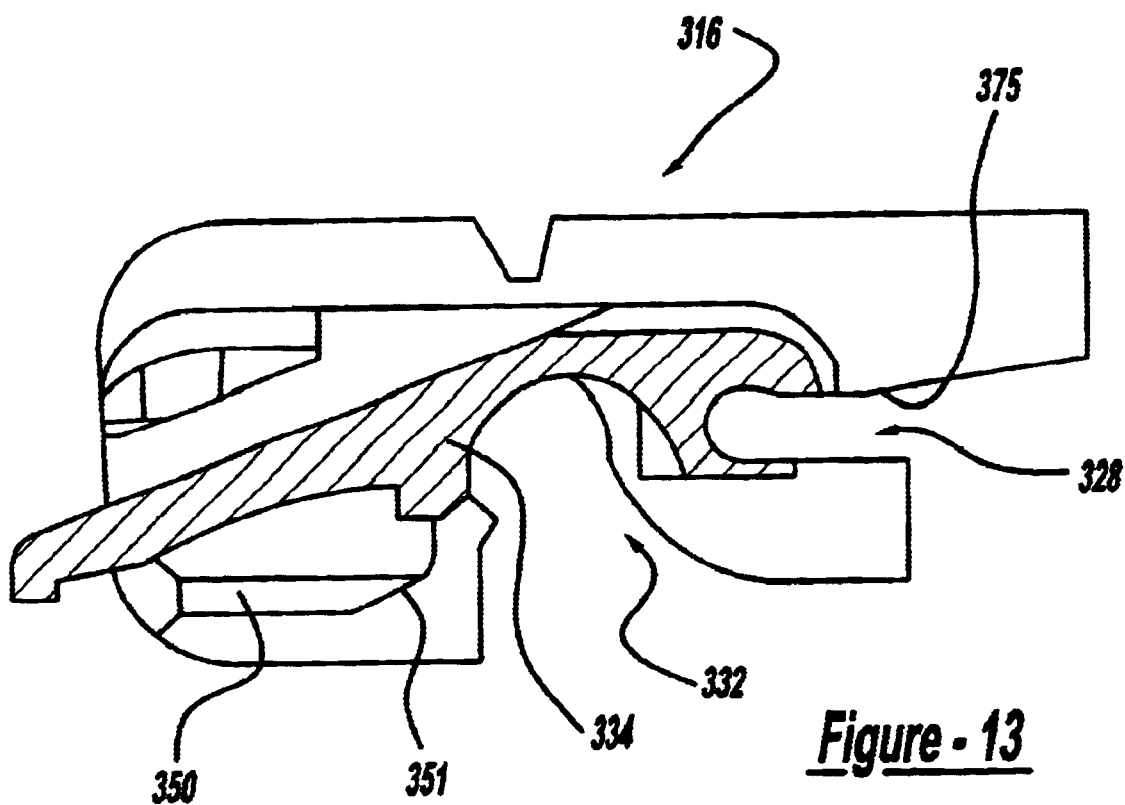
FIG. 13 is a sectional view taken along the longitudinal center of the connector shown in FIG. 11.

Three additional embodiments of the present invention are illustrated in FIGS. 9–14 and include a second connector 216 having a central bridge 226 wherein the arcuate clip 234 is fixed relative to the front bridge portion 260 and connector side walls. This embodiment illustrates that the positioning of the tail rail 50 completely rearward of the rivet and pin passages may be achieved with a variety of bridge and pin engagement configurations. FIGS. 9, 10, and 11, respectively, illustrate the connection of the 7 mm, 9 mm×3 mm, and 9 mm×4 mm hook arms to the second connector embodiment 216. A third embodiment of the connector, indicated by reference numeral 316 in FIGS. 12 and 13 illustrate the use of a cantilevered and tabbed beam 334 providing the movable latch feature of the first embodiment as well as a positive interlock with slotted 7 mm and 9 mm×3 mm hook arms. Additionally, the rivet entrances 375 communicate with the rivet slots and extend forward thereof rather than in the downward and rearward direction discussed with reference to the first embodiment. Yet again, the forwardmost point 351 of the tail rail 350, is positioned entirely rearward of both the pin and rivet passages 332 and 328.

Figure 14:
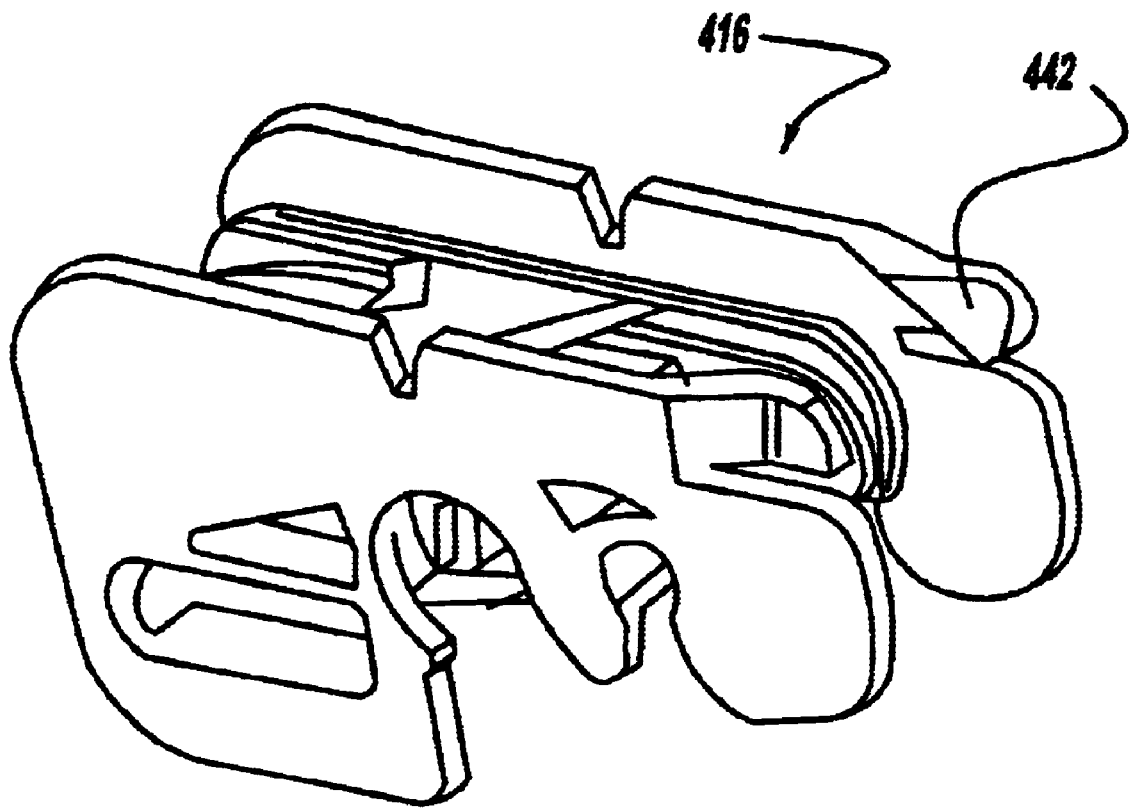
FIG. 14 is a perspective view of a fourth connector embodiment according to the present invention.

Finally, FIG. 12 illustrates that an alternative front wing locking tab configuration may be used in combination with the movable tabbed beam. Specifically, while the movable tabbed beam 334 interlocks with slotted 7 mm and 9 mm×3 mm hook arms, the wing tabs 343 are used to couple the connector to 9 mm×4 mm hook arms (slotted or unslotted) as well as unslotted 9 mm×3 mm hook arms. Yet another wing tab 442 configuration for a movable tabbed beam embodiment is illustrated by the connector 416 shown in FIG. 14. It should be noted that in each of the front wing tab configurations illustrated in FIGS. 12–14, the tabs are configured to deform to permit passage of the 9 mm wide hook arms without requiring the tabs to extend beyond the outer lateral extent of the connector side walls. More particularly, in the third embodiment shown in FIGS. 12 and 13, the tabs have a horizontal "V" shape wherein the angle at the vertex of the V can increase during passage of the 9 mm hook arms without requiring displacement beyond the lateral extent of the connector side walls. A similar deformable yet resilient tab configuration is illustrated in FIG. 14.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A connector for connecting a wiper blade assembly to a wiper arm, said connector comprising:
   first and second side walls spaced from one another;
   a central bridge interconnecting said first and second side walls, said central bridge and first and second side walls defining a pin passage and a rivet passage; and
   a rail interconnecting said first and second side walls and vertically spaced from said central bridge to define a tail space between said bridge and said rail, said rail having a forwardmost free end positioned rearward of said pin passage and said rivet passage to define a rail-free hook insertion space below said bridge, forward of said pin passage, and between said side walls.

2. The connector of claim 1 wherein said central bridge includes an upper bearing surface and a lower surface, said upper bearing surface being vertically spaced a first distance from said lower surface so that said central bridge is positionable between a body and a tail of a small hook arm with the tail of the small hook arm being above the rail.

3. The connector of claim 2 wherein said connector further includes a step extending along said side walls, said step having an upper surface above said upper bearing surface, said upper surface being vertically spaced a second distance from said lower bearing surface, said second distance being greater than said first distance so that said central bridge is positionable between the body and tail of a medium hook arm with the hook tail being above the rail.

4. The connector of claim 3 wherein said rail includes an upper face and a lower face, and wherein said tail space is between said upper face of said rail and said lower surface of said central bridge.

5. The connector of claim 4 wherein said upper surface of said step is vertically spaced a third distance from said lower face of said rail, said third distance being greater than said second distance so that said central bridge is positionable between the body and tail of a large hook arm with the hook tail of the large hook arm being below the lower face of said rail.

6. The connector of claim 5 wherein the large hook arm is a 9 mm×4 mm hook arm, the medium hook arm is a 9 mm×3 mm hook arm, and the small hook is a 7 mm hook arm.

7. The connector of claim 1 wherein said side walls include a rivet slot partially defining said rivet passage and a rivet entrance communicating with and extending substantially downward from said rivet slot, said rivet entrance being oriented at a rearward angle from vertical.

8. The connector of claim 7 wherein said rearward angle is about ten degrees.

9. The connector of claim 1 wherein said side walls include front wings extending forward of said central bridge and engagement tabs extending inward from said wings, said front wings each having a cavity to permit laterally outward movement of said engagement tabs into said cavities during connection of a hook arm without said engagement tabs extending beyond the outward lateral extent of said front wings.

10. The connector of claim 1 wherein said central bridge includes a front segment and a rear segment, said front and rear segments being longitudinally spaced from one another to define a gap therebetween, said front segment including a first section fixed to said side walls and a movable latch cantilevered from said first section.

11. The connector of claim 1 further including a step extending above an upper bearing surface of said central bridge and along said side walls to define an upper horizontal seat and a lower horizontal seat, wherein said rail includes an upper face and a lower face, wherein said tail space is between said upper face of said rail and said lower surface of said central bridge, and wherein said side walls include front wings extending forward of said central bridge, said connector further including first and second tabs extending inward from said wings and spaced from one another to define a first hook space between said central bridge and said first tab and a second hook space between said first and second tabs, and wherein said lower horizontal seat, first hook space, and tail space define a small hook corridor, said upper horizontal seat, second hook space, and tail space define a medium hook corridor, and said upper horizontal seat, second hook space, and an area below the lower rail face define a large hook corridor.

12. The connector of claim 11 further including a rear bayonet slot and wherein said pin passage is configured to receive one-quarter inch and three-sixteenth inch pin arms.

13. The connector of claim 12 wherein said central bridge includes a front portion and a rear portion longitudinally spaced from one another to define a gap therebetween, said front portion including a first section fixed to said side walls and a movable latch cantilevered from said first section and operably disposed within said pin passage.

14. A wiper blade comprising:
a frame;
a connector coupled to said frame and adapted to permit selective coupling of a small, medium, and large hook arm, first and second pin arms, and a bayonet arm to said frame, said connector including first and second side walls spaced from one another;
a central bridge interconnecting said first and second side walls, said central bridge and first and second side walls defining a pin passage and a rivet passage; and
a rail interconnecting said first and second side walls and vertically spaced from said central bridge to define a tail space between said bridge and said rail, said rail having a forwardmost free end positioned rearward of said pin passage and said rivet passage to define a rail-free hook insertion space below said bridge, forward of said pin passage, and between said side walls.

15. The wiper blade of claim 14 wherein said central bridge includes an upper bearing surface and a lower surface, said upper bearing surface being vertically spaced a first distance from said lower surface so that said central bridge is positionable between the body and tail of a small hook arm with the hook tail being above the rail.

16. The wiper blade of claim 15 wherein said connector further includes a step extending along said side walls, said step having an upper surface above said upper bearing surface, said upper surface being vertically spaced a second distance from said lower bearing surface, said second distance being greater than said first distance so that said central bridge is positionable between the body and tail of a medium hook arm with the hook tail being above the rail.

17. The wiper blade of claim 16 wherein said rail includes an upper face and a lower face, and wherein said tail space is between said upper face of said rail and said lower surface of said central bridge.

18. The wiper blade of claim 17 wherein said upper surface of said step is vertically spaced a third distance from said lower face of said rail, said third distance being greater than said second distance so that said central bridge is positionable between the body and tail of a large hook arm with the hook tail of the large hook arm being below the lower face of said rail.

19. The wiper blade of claim 14 wherein said side walls include a rivet slot partially defining said rivet passage and a rivet entrance communicating with and extending substantially downward from said rivet slot, said rivet entrance being oriented at a rearward angle from vertical.

20. The wiper blade of claim 19 wherein said rearward angle is about ten degrees.

21. The wiper blade of claim 14 further including a step extending above an upper bearing surface of said central bridge and along said side walls to define an upper horizontal seat and a lower horizontal seat, wherein said rail includes an upper face and a lower face, wherein said tail space is between said upper face of said rail and said lower surface of said central bridge, and wherein said side walls include front wings extending forward of said central bridge, said connector further including first and second tabs extending inward from said wings and spaced from one another to define a first hook space between said central bridge and said first tab and a second hook space between said first and second tabs, and wherein said lower horizontal seat, first hook space, and tail space define a small hook corridor, said upper horizontal seat, second hook space, and tail space define a medium hook corridor, and said upper horizontal seat, second hook space, and an area below the lower rail face define a large hook corridor.

22. A connector for connecting a wiper blade assembly to a wiper arm, said connector comprising:
first and second side walls spaced from one another;
a central bridge interconnecting said first and second side walls, said central bridge and first and second side walls defining a pin passage and a rivet passage;
a rail interconnecting said first and second side walls and vertically spaced from said central bridge to define a tail space between said bridge and said rail, said rail having a forwardmost end positioned rearward of said pin passage and said rivet passage;
said central bridge including an upper bearing surface and a lower surface, said upper bearing surface being vertically spaced a first distance from said lower surface so that said central bridge is positionable between a body and a tail of a small hook arm with the tail of the small hook arm being above the rail; and
a step extending along said side walls, said step having an upper surface above said upper bearing surface, said upper surface being vertically spaced a second distance from said lower bearing surface, said second distance being greater than said first distance so that said central bridge is positionable between a body and a tail of a medium hook arm with the tail of the medium hook arm being above the rail.

23. A connector for connecting a wiper blade assembly to a wiper arm, said connector comprising:
first and second side walls spaced from one another;
a central bridge interconnecting said first and second side walls, said central bridge and first and second side walls defining a pin passage and a rivet passage, wherein said side walls include front wings extending forward of said central bridge and engagement tabs extending inward from said wings, said front wings each having a cavity to permit laterally outward movement of said engagement tabs into said cavities during connection of a hook arm without said engagement tabs extending beyond the outward lateral extent of said front wings; and
a rail interconnecting said first and second side walls and vertically spaced from said central bridge to define a tail space between said bridge and said rail, said rail having a forwardmost end positioned rearward of said pin passage and said rivet passage.

24. A connector for connecting a wiper blade assembly to a wiper arm, said connector comprising:
first and second side walls spaced from one another;
a central bridge interconnecting said first and second side walls, said central bridge and first and second side walls defining a pin passage and a rivet passage, wherein said central bridge includes a front segment and a rear segment, said front and rear segments being longitudinally spaced from one another to define a gap therebetween, said front segment including a first section fixed to said side walls and a movable latch cantilevered from said first section; and a rail interconnecting said first and second side walls and vertically spaced from said central bridge to define a tail space between said bridge and said rail, said rail having a forwardmost end positioned rearward of said pin passage and said rivet passage.

25. A connector for connecting a wiper blade assembly to a wiper arm, said connector comprising:

first and second side walls spaced from one another;

a central bridge interconnecting said first and second side walls, said central bridge and first and second side walls defining a pin passage and a rivet passage;

a rail interconnecting said first and second side walls and vertically spaced from said central bridge to define a tail space between said bridge and said rail, said rail having a forwardmost end positioned rearward of said pin passage and said rivet passage; and a step extending above an upper bearing surface of said central bridge and along said side walls to define an upper horizontal seat and a lower horizontal seat, wherein said rail includes an upper face and a lower face, wherein said tail space is between said upper face of said rail and said lower surface of said central bridge, and wherein said side walls include front wings extending forward of said central bridge, said connector further including first and second tabs extending inward from said wings and spaced from one another to define a first hook space between said central bridge and said first tab and a second hook space between said first and second tabs, and wherein said lower horizontal seat, first hook space, and tail space define a small hook corridor, said upper horizontal seat, second hook space, and tail space define a medium hook corridor, and said upper horizontal seat, second hook space, and an area below the lower rail face define a large hook corridor.

* * * * *